(12) United States Patent
Benage et al.

(10) Patent No.: US 7,943,809 B2
(45) Date of Patent: May 17, 2011

(54) COMPOSITION AND METHOD FOR INHIBITING POLYMERIZATION AND POLYMER GROWTH

(75) Inventors: Brigitte Benage, Wolcott, CT (US); Gerald J. Abruscato, Southington, CT (US); David J. Sikora, Middlebury, CT (US); Ruben S. Grewal, Oakville, CT (US)

(73) Assignee: Chemtura Corporation, Middlebury, CT (US)

( * ) Notice: Subject to any disclaimer, the term of this patent is extended or adjusted under 35 U.S.C. 154(b) by 0 days.

(21) Appl. No.: 12/582,419

(22) Filed: Oct. 20, 2009

(65) Prior Publication Data

US 2010/0093897 A1 Apr. 15, 2010

Related U.S. Application Data

(62) Division of application No. 11/024,342, filed on Dec. 28, 2004, now abandoned, which is a division of application No. 09/580,343, filed on May 25, 2000, now abandoned.

(60) Provisional application No. 60/168,623, filed on Dec. 3, 1999.

(51) Int. Cl.
*C10G 9/16* (2006.01)

(52) U.S. Cl. .................. 585/950; 208/48 R; 208/48 AA

(58) Field of Classification Search ........................ None
See application file for complete search history.

(56) References Cited

U.S. PATENT DOCUMENTS

| | | | |
|---|---|---|---|
| 1,127,127 A | 2/1915 | Walsh | |
| 2,225,471 A | 12/1940 | Foord | 23/250 |
| 2,304,728 A | 12/1942 | Boyer et al. | 260/669 |
| 3,148,225 A | 9/1964 | Albert | |
| 3,163,677 A | 12/1964 | Hoffman et al. | 260/583 |
| 3,334,103 A | 8/1967 | Feldman et al. | 260/290 |
| 3,372,182 A | 3/1968 | Hoffman et al. | 260/465.5 |
| 3,422,144 A | 1/1969 | Hoffmann et al. | 260/570 |
| 3,494,930 A | 2/1970 | Dupeyre et al. | 260/294.7 |
| 3,502,692 A | 3/1970 | Feldman et al. | 260/326.3 |
| 3,873,564 A | 3/1975 | Schneider et al. | 260/309.6 |
| 3,959,395 A | 5/1976 | Higgins et al. | 260/622 |
| 3,966,711 A | 6/1976 | Rasberger | 260/239.3 |
| 4,033,829 A | 7/1977 | Higgins et al. | 203/9 |
| 4,053,304 A | 10/1977 | Tsuda | |
| 4,053,504 A | 10/1977 | Rosenkranz et al. | 560/4 |
| 4,105,506 A | 8/1978 | Watson | 203/9 |
| 4,182,658 A | 1/1980 | Watson | 203/9 |
| 4,252,615 A | 2/1981 | Watson | 203/9 |
| 4,434,307 A | 2/1984 | Miller | 585/4 |
| 4,439,278 A | 3/1984 | Douglas et al. | 203/9 |
| 4,466,904 A | 8/1984 | Watson et al. | 252/402 |
| 4,466,905 A | 8/1984 | Butler et al. | 252/403 |
| 4,468,343 A | 8/1984 | Butler et al. | 252/403 |
| 4,469,558 A | 9/1984 | Watson | 202/154 |
| 4,480,116 A | 10/1984 | Clonce et al. | |
| 4,558,169 A | 12/1985 | Watson et al. | 585/440 |
| 4,665,185 A | 5/1987 | Winter et al. | 546/184 |
| 4,692,544 A | 9/1987 | Goerner et al. | 560/4 |
| 4,720,566 A | 1/1988 | Martin | 558/306 |
| 4,774,374 A | 9/1988 | Abruscato et al. | 585/24 |
| 4,797,504 A | 1/1989 | Roling | 560/4 |
| 4,912,247 A | 3/1990 | Roling | 558/306 |
| 4,929,778 A | 5/1990 | Roling | 585/3 |
| 5,128,022 A | 7/1992 | Reid | 208/48 |
| 5,254,760 A | 10/1993 | Winter et al. | 585/5 |
| 5,372,924 A | 12/1994 | Quintens et al. | 430/527 |
| 5,446,220 A | 8/1995 | Arhancet | 585/5 |
| 5,545,782 A | 8/1996 | Winter et al. | 585/5 |
| 5,545,786 A | 8/1996 | Winter et al. | 585/435 |
| 5,590,232 A | 12/1996 | Wentworth et al. | |
| 5,648,573 A | 7/1997 | Arhancet et al. | |
| 5,648,574 A | 7/1997 | Arhancet et al. | 585/5 |
| 5,907,071 A | 5/1999 | Arhancet | 585/5 |
| 5,910,232 A | 6/1999 | Hyde et al. | |
| 5,922,244 A | 7/1999 | Koch et al. | |
| 5,955,643 A | 9/1999 | Lewis | 585/899 |
| 6,136,951 A | 10/2000 | Benage et al. | |
| 6,143,205 A | 11/2000 | Sutoris et al. | 252/405 |
| 6,284,936 B2 | 9/2001 | Shahid | 585/4 |
| 6,300,533 B1 | 10/2001 | Benage et al. | 585/5 |
| 6,403,850 B1 | 6/2002 | Benage et al. | 585/5 |
| 6,525,146 B1 * | 2/2003 | Shahid | 526/82 |
| 6,653,414 B2 | 11/2003 | Benage et al. | |
| 6,660,181 B2 | 12/2003 | Benage et al. | |
| 6,686,422 B2 * | 2/2004 | Shahid | 526/82 |
| 7,045,647 B2 | 5/2006 | Benage | |
| 7,473,795 B2 | 1/2009 | Benage | |
| 2002/0037958 A1 | 3/2002 | Benage et al. | 524/714 |

FOREIGN PATENT DOCUMENTS

| | | |
|---|---|---|
| CS | 260755 B1 | 5/1989 |
| EP | 0 178 168 A2 | 4/1986 |
| EP | 0398633 A1 | 5/1989 |
| EP | 0325059 A2 | 7/1989 |
| EP | 0398633 A1 | 11/1990 |
| EP | 0594341 A1 | 4/1994 |
| EP | 0 765 856 A1 | 4/1997 |
| FR | 2761060 | 9/1998 |
| GB | 1127127 | 9/1968 |
| GB | 2069523 A | 8/1981 |
| JP | 51-95490 | 8/1976 |
| JP | 59-131614 | 7/1984 |
| JP | 60-88023 | 5/1985 |

(Continued)

OTHER PUBLICATIONS

Hawker et al., Macromolecules 29(16):5245-5254 (1996).
Ivan, Macromol. Symp. 88:201-215 (1994).
Greszta et al., Macromolecules 29:7661-7670 (1996).
Shigemoto et al., Macromol. Rapid Commun. 17:347-351 (1996)
Georges et al., Macromolecules 26(11):2987-2988 (1993).

*Primary Examiner* — Tam M Nguyen

(74) *Attorney, Agent, or Firm* — Joseph Suhadolnik

(57) ABSTRACT

A method for inhibiting the premature polymerization and the polymer growth of ethylenically unsaturated monomers is disclosed wherein the method comprises adding to said monomers an effective amount of at least one hydrogen donor or electron acceptor. In a preferred embodiment, the hydrogen donor or electron acceptor is used in combination with a stable nitroxyl free radical.

10 Claims, No Drawings

FOREIGN PATENT DOCUMENTS

| | | |
|---|---|---|
| SU | 478838 | 7/1975 |
| SU | 334845 A1 | 1/1984 |
| WO | 97/46504 | 12/1997 |
| WO | 98/02403 | 1/1998 |
| WO | 98/14416 | 4/1998 |
| WO | 98/25872 | 6/1998 |

* cited by examiner

COMPOSITION AND METHOD FOR INHIBITING POLYMERIZATION AND POLYMER GROWTH

This is a divisional application of U.S. application Ser. No. 11/024,342, filed on Dec. 28, 2004, now abandoned, which is a divisional application of U.S. application Ser. No. 09/580,343, filed May 25, 2000, now abandoned, for which the benefit under Title 35, United States Code, §120 to U.S. Provisional Application No. 60/168,623, filed Dec. 3, 1999, entitled COMPOSITION AND METHOD FOR INHIBITING POLYMERIZATION AND POLYMER GROWTH has been claimed. The entire contents and disclosures of which are hereby incorporated by reference.

BACKGROUND OF THE INVENTION

1. Field of the Invention

The present invention is directed to the inhibition of polymerization and polymer growth of ethylenically unsaturated monomers by means of the addition thereto of hydrogen donors and/or electron acceptors, either alone or in combination with at least one stable nitroxide free radical compound.

2. Description of Related Art

Many ethylenically unsaturated monomers undesirably polymerize at various stages of their manufacture, processing, handling, storage, and use. Polymerization, such as thermal polymerization, during their purification results in the loss of the monomer, i.e., a lower yield, and an increase in the viscosity of any tars that may be produced. The processing and handling of the higher viscosity tars then requires higher temperature and work (energy cost) to remove residual monomer.

Polymerization can also result in equipment fouling, especially in the case of production of acrylic monomers. Such polymerization causes loss in production efficiency owing to the deposition of polymer in or on the equipment being used. These deposits must be removed from time to time, leading to additional loss in production of the monomer.

A wide variety of compounds has been proposed and used for inhibiting uncontrolled and undesired polymerization of ethylenically unsaturated monomers. However, many of these compounds have not been fully satisfactory.

There are several mechanisms by which polymerization inhibitors work. One mode of action for polymerization inhibitors is for the inhibiting species to combine with the propagating polymer chain such that the polymerization of that polymer chain stops, i.e., a termination reaction. If such an inhibitor-terminated polymer chain is capable of participating in a dynamic equilibrium between a dormant species (the inhibitor-terminated chain) and an active polymer chain, it would be considered a "living" or quasiliving polymer. For example, Ivan, *Macromol. Symp.* 88:201-215 (1994) describes quasiliving polymerization as a polymerization in which " . . . only a portion of chain ends are active (propagating) and these are in equilibria with inactive (dormant, non-propagating) chains . . . " Shigemoto et al., *Macromol. Rapid Commun.* 17:347-351 (1996) state, "Well-defined polymers can be prepared by controlled/"living" radical polymerization in the presence of relatively stable radicals. These systems employ the principle of dynamic equilibration between dormant species and growing radicals via reversible homolytic cleavage of a covalent bond in dormant species." Further, Greszta et al., *Macromolecules* 29:7661-7670 (1996) state, "The reversible homolytic cleavage of dormant species can be accomplished by either thermal, photochemical, or catalytic activation. The most successful approaches are as follows: homolytic cleavage of alkoxyamines and dithiocarbamates, use of various organometallic species, and catalyzed atom transfer radical polymerization." Such a "living" polymer is capable of increasing in molecular weight (growing) through its reaction with additional monomer units of the same or different types of polymerizable monomers.

The method by which this "living" polymer grows is termed the "living" polymerization mechanism, and is depicted below.

  (1)

  (2)

  (3)

  (4)

Reactions (1) and (2) depict the dynamic equilibrium, with (2) being the termination reaction. Reaction (3) depicts growth of the polymer chain. Reaction (4) depicts re-termination of the growing polymer chain with the inhibiting species. The amount of growth over any period of time is dependent on the relative rate at which (2) occurs versus (3), as long as (1) occurs to some extent. The faster (2) is relative to (3), the more time is needed for significant growth of the polymer. Under the conditions in which inhibitors are normally used, the concentration of the inhibiting species should be sufficiently high to cause reaction (2) to be much faster than reaction (3), otherwise it would not be an effective inhibiting system for commercial use. However, we have realized that even at an effective inhibiting amount of the inhibitor, growth can still occur, given sufficient time and temperature.

There are at least two scenarios in which "living" polymer can remain in a monomer purification train for an excessive amount of time.

First, the use of recycle can significantly increase the amount of time that the "living" polymer can remain in the purification train. To recycle unused inhibitor that is left in the purification stream after removal of the monomer, a portion of the residual stream is added to a feed stream earlier in the purification train. This residual stream typically contains inhibitor, small amounts of monomer, impurities in the monomer stream that have been concentrated by the purification process, and polymer formed during the production and purification process. Recycling this polymer will allow it time to grow if it is "living" polymer and the conditions of the purification train allow the "living" polymerization mechanism to occur. If this polymer grows via the "living" polymerization mechanism, excessive polymerization would cause loss in product yield, increased waste residues from the process, and potential plugging of equipment due to excessively high molecular weight polymer in the purification stream.

Second, occasionally, conditions in the plant/purification process can result in the formation of polymer within the purification train that is not dissolved by the monomer stream. If this polymer is caught in a dead space, or if it attaches to the metal on the inside of the equipment, it will not be washed out of the system. Thus, the polymer will remain within the system indefinitely (potentially for two or more years). If this polymer grows via the "living" polymerization mechanism, it could coat the inside of the equipment, causing inefficient separation of the monomer stream components and/or insufficient heating of the stream to enable purification. Such a situation would cause loss in product yield and could potentially cause an unscheduled shut-down of the plant in order to clean out the undissolved polymer in the equipment. Such a shut-down results in loss of monomer production and additional expense to clean out and dispose of the undissolved polymer.

It is significant that there has been no indication that previously used inhibitors would lead to the formation of "living" polymer when used as polymerization inhibitors. However, a newly utilized class of inhibitors, the stable nitroxyl radicals, is known to allow this "living" polymerization mechanism to occur. These nitroxyl radicals are highly efficient polymerization inhibitors under normal use, providing better performance than most other inhibitors on the market, but their incapacity to prevent "living" polymerization has hindered their full utilization. Accordingly, there is a need for compositions that can be used in a purification train, preferably in combination with nitroxyl radicals, to prevent polymer growth that occurs via a "living" polymerization mechanism.

Nitroxyl radicals are known to facilitate polymerization via a "living" free radical process to give polymers of narrow polydispersity.

Georges et al., *Macromolecules* 26(11):2987-2988 (1993) synthesized narrow molecular weight resins by a free-radical polymerization process with polydispersities comparable to those that can be obtained by anionic polymerization processes and below the theoretical limiting polydispersity of 1.5 for a conventional free-radical polymerization process. The process comprised heating a mixture of monomer(s), free-radical initiator, and a stable free radical, e.g., 2,2,6,6-tetramethyl-1-piperidinyloxy (TEMPO).

Hawker et al., *Macromolecules* 29(16):5245-5254 (1996) prepared and evaluated a variety of initiating systems for the preparation of macromolecules by nitroxide-mediated "living" free radical procedures. The systems were divided into two classes, unimolecular initiators in which alkylated TEMPO derivatives dissociate to provide both the initiating radical and the stable radical, and bimolecular systems in which a traditional free radical initiator, such as BPO or AIBN, is used in conjunction with TEMPO. For the unimolecular initiators it was found that an α-methyl group is essential for "living" character, while a variety of substituents could be placed on the phenyl ring or the β-carbon atom without affecting the efficiency of the unimolecular initiator. It was found that the rate of polymerization is approximately the same for both the unimolecular and corresponding bimolecular systems; however, the unimolecular initiators afforded better control over molecular weight and polydispersity.

The inventors are unaware of any art on the use of compounds to prevent polymer growth that occurs via a "living" polymerization mechanism since this growth phenomenon is not known to have previously been observed. Hindered nitroxyl compounds are known to be very active inhibitors of free radical polymerizations of unsaturated monomers such as styrene, acrylic acid, methacrylic acid, and the like. Nitrophenols, nitrosophenols, phenylenediamines (PDA's), hydroxylamines, quinones and hydroquinones are also known to have a similar capacity.

U.S. Pat. No. 2,304,728 discloses that a vinyl aromatic compound may effectively be stabilized against polymerization by dissolving therein a monohydric halonitrophenol having the general formula:

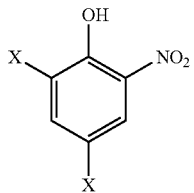

wherein one X represents a halogen and the other X represents a member of the group consisting of hydrogen and halogen and nitro substituents.

U.S. Pat. No. 3,163,677 discloses a process for the preparation of N,N,O-trisubstituted hydroxylamines and N,N-disubstituted nitroxides of the formulae:

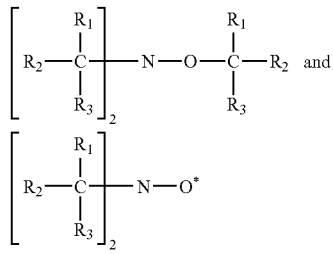

wherein $R_1$, $R_2$, and $R_3$ are each an alkyl radical having 1 to 15 carbon atoms. (As used herein, the designation N—O* denotes a stable free radical wherein the asterisk is an unpaired electron.) The N,N,O-trisubstituted hydroxylamines can be used to make the N,N-disubstituted nitroxides, which are stable free radicals and are said to be useful as polymerization inhibitors.

U.S. Pat. No. 3,334,103 discloses that nitroxides can be prepared from the corresponding heterocyclic amine wherein the nitrogen atom of the nitroxide group is attached to other than a tertiary carbon of an aliphatic group (i.e., the nitrogen atom forms a part of a heterocyclic nucleus). These nitroxides are said to have useful properties similar to those described for the N,N-disubstituted nitroxides of U.S. Pat. No. 3,163,677.

U.S. Pat. No. 3,372,182 discloses that a great variety of N,N-disubstituted, stable, free radical nitroxides not otherwise readily available can be prepared by a simple and convenient process that comprises pyrolyzing in an inert reaction medium virtually any hydroxylamine that is susceptible to cleavage of the O—C bond, e.g., tri-t-butylhydroxylamine.

U.S. Pat. No. 3,422,144 discloses stable, free radical nitroxides of the formula:

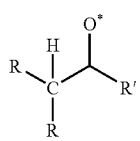

wherein R is selected from the group consisting of tertiary alkyl, aryl, alkaryl, haloaryl, carboxyaryl, alkoxyaryl, alkylthioaryl, pyridyl, and dialkylaminoaryl, and R' is tertiary alkyl. These nitroxides are said to be useful as traps for reactive free radicals both in the counting of free radicals and for inhibiting oxidation and free radical polymerization.

U.S. Pat. No. 3,494,930 discloses free radicals of the nitroxide type for use as initiators of free radical reactions, collectors of free radicals, polymerization inhibitors or antioxidants. They are constituted by nitrogenous bicyclic compounds in which one of the bridges comprises solely the nitroxide radical group and, in particular, by aza-9-bicyclo(3,3,1) nonanone-3-oxyl-9, and by aza-9-bicyclo(3,3,1) nonane oxyl-9.

U.S. Pat. No. 3,873,564 discloses compounds and a method for assaying enzymes by adding to a medium containing an enzyme a stable free radical compound having a stable free radical functionality which, when subjected to an enzyme-catalyzed reaction, changes the environment of the free radical functionality. By following the change in the electron spin resonance spectrum as affected by the change in environment, the type of enzyme and the activity of the enzyme can be determined. The compounds found useful are normally stable nitroxide radicals with an enzyme labile functionality. Other compounds include two cyclic nitroxide containing rings joined by a chain having an enzyme labile functionality.

U.S. Pat. No. 3,966,711 teaches that 2,2,7,7-tetraalkyl- and 2,7-dispiroalkylene-5-oxo-1,4-diazacycloheptanes substituted in the 4-position by mono- or tetravalent radicals are powerful light-stabilizers for organic polymers. They are said to possess higher compatibility than their 4-unsubstituted homologues, from which they can be synthesized by reactions known for N-alkylation. Preferred substituents in the 4-position are alkyl, alkylene, alkenyl, aralkyl, and esteralkyl groups. The 1-nitroxyls derived from the imidazolidines by oxidation with hydrogen peroxide or percarboxylic acids are also said to be good light stabilizers.

U.S. Pat. No. 4,105,506 discloses a process for the distillation of readily polymerizable vinyl aromatic compounds and a polymerization inhibitor therefor. The process comprises subjecting a vinyl aromatic compound to elevated temperatures in a distillation system in the presence of a polymerization inhibitor comprising 2,6-dinitro-p-cresol.

U.S. Pat. Nos. 4,252,615 and 4,469,558 disclose a process for the distillation of readily polymerizable vinyl aromatic compounds and a polymerization inhibitor therefor. The process comprises subjecting a vinyl aromatic compound to elevated temperatures in a distillation system in the presence of a polymerization inhibitor comprising 2,6-dinitro-p-cresol. Also disclosed is a distillation method and apparatus for use with this inhibitor.

U.S. Pat. No. 4,434,307 discloses the stabilization of vinyl aromatic compounds against undesired polymerization by adding to the vinyl aromatic compounds small amounts of at least one N,N-diarylhydroxylamine and at least one mono- or ditertiary alkyl catechol and/or at least one mono- or ditertiary alkylhydroquinone.

U.S. Pat. No. 4,439,278 discloses an improvement in methods for preparing and processing ethylenically unsaturated aromatic monomer. The improvement comprises employing 3,5-dinitrosalicylic acid or a derivative or isomer thereof as a process inhibitor. The process inhibitor is present in a concentration of about 50 to 3000 ppm, preferably about 250 to 2,000 ppm, and most preferably about 500 to 1,000 ppm.

U.S. Pat. No. 4,466,904 discloses a compound and a process for utilizing the compound to prevent the polymerization of vinyl aromatic compounds, such as styrene, during heating. The compound includes effective amounts of phenothiazine, 4-tert-butylcatechol and 2,6-dinitro-p-cresol respectively, as a polymerization inhibitor system in the presence of oxygen resulting in a less viscous polymer tar and in the effective inhibition of polymerization to temperatures as high as 150° C.

U.S. Pat. Nos. 4,466,905 and 4,468,343 disclose a compound and a process for utilizing the compound to prevent the polymerization of vinyl aromatic compounds, such as styrene, during heating. The composition includes effective amounts of 2,6-dinitro-p-cresol and either a phenylenediamine or 4-tert-butylcatechol respectively, to act as a polymerization co-inhibitor system in the presence of oxygen.

U.S. Pat. No. 4,480,116 discloses an improvement in methods for preparing and processing readily polymerizable acrylate monomers. The improvement comprises employing phenyl-para-benzoquinone, 2,5-di-phenyl-para-benzoquinone, and mixtures thereof as process inhibitors. The process inhibitors are present in a concentration of about 50 to 3000 ppm, preferably about 250 to 2000 ppm, and most preferably about 500 ppm.

U.S. Pat. No. 4,558,169 discloses a process for preparing vinyltoluene comprising passing ethyltoluene through a dehydrogenation zone to form vaporous crude vinyltoluene, adding from about 50 to about 100 parts per million by weight of a polymerization inhibitor such as a nitrated phenol to the vaporous crude vinyltoluene at a temperature between about 200° and about 300° C., condensing the vaporous crude vinyltoluene, maintaining the pH of the aqueous phase of the condensed crude vinyltoluene at a value between about 5.5 and about 6.5 sufficient to maintain the inhibitor in the organic phase of the condensed crude vinyltoluene, adding a second portion of polymerization inhibitor to the condensed crude vinyltoluene until the inhibitor concentration totals about 500 parts per million by weight relative to the vinyltoluene content of the crude vinyltoluene, filtering the condensed crude vinyltoluene to remove seed polymer, and distilling the condensed crude vinyltoluene to recover substantially pure vinyltoluene; and apparatus for carrying out said method.

U.S. Pat. No. 4,665,185 discloses a process for the efficient preparation of nitroxyls of sterically hindered amines by the oxidation of the amine using a hydroperoxide in the presence of a small amount of a metal ion catalyst, at moderate temperature for a short period of time, to give the nitroxyl in high yield and purity.

U.S. Pat. No. 4,692,544 discloses certain substituted diaryl amines that are used to inhibit the polymerization of ethylenically unsaturated monomers; for example, unsaturated carboxylic acids and derivatives thereof.

U.S. Pat. No. 4,720,566 discloses compositions and methods of inhibiting acrylonitrile polymerization, particularly in quench columns of systems producing acrylonitrile, comprising adding to the acrylonitrile an effective amount for the purpose of (a) a hydroxylamine having the formula

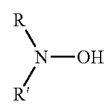

wherein R and R' are the same or different and are hydrogen, alkyl, aryl, alkaryl or aralkyl groups, and (b) a para-phenylenediamine or derivative thereof having at least one N—H group. Preferably the phenylenediamine is a para-phenylenediamine having the formula

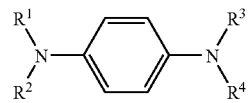

wherein $R^1$, $R^2$, $R^3$ and $R^4$ are the same or different and are hydrogen, alkyl, aryl, alkaryl, or aralkyl groups with the proviso that at least one of $R^1$, $R^2$, $R^3$ or $R^4$ is hydrogen.

U.S. Pat. No. 4,774,374 discloses a vinyl aromatic composition stabilized against polymerization comprising (a) a vinyl aromatic compound and (b) an effective amount of a stabilizer system in which the active ingredient consists essentially of an oxygenated species formed by the reaction of oxygen and an N-aryl-N'-alkyl-p-phenylenediamine.

U.S. Pat. No. 4,797,504 discloses compositions and methods of inhibiting acrylate monomer polymerization at elevated temperatures comprising adding to the acrylate monomer an effective amount for the purpose of (a) a hydroxylamine having the formula

wherein R and R' are the same or different and are hydrogen, alkyl, aryl, alkaryl or aralkyl groups, and (b) a para-phenylenediamine or derivative thereof having at least one N—H group. Preferably the phenylenediamine is a para-phenylenediamine having the formula

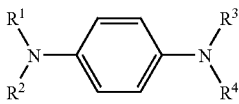

wherein $R^1$, $R^2$, $R^3$ and $R^4$ are the same or different and are hydrogen, alkyl, aryl, alkaryl, or aralkyl groups with the proviso that at least one of $R^1$, $R^2$, $R^3$ or $R^4$ is hydrogen.

U.S. Pat. No. 4,912,247 discloses a composition and method of use for inhibiting the polymerization of acrylate esters during elevated temperature processing and during storage and handling thereafter. It comprises the combination of a Mannich reaction product, which is prepared from a substituted phenol, an aldehyde and ethylenediamine, and either phenylenediamine or derivatives thereof and/or phenothiazine or derivatives thereof.

U.S. Pat. No. 4,929,778 discloses methods and compositions for inhibiting the polymerization of styrene monomer during elevated temperature processing thereof or during storage or shipment of styrene containing product. The compositions comprise a combination of (a) a phenylenediamine compound having at least one N—H bond and (b) a hindered phenol compound. The methods comprise adding from 1-10,000 ppm of the combination to the styrene medium, per one million parts of styrene.

U.S. Pat. No. 5,128,022 discloses methods and compositions for inhibiting the formation of polymers in petroleum or petrochemical processes that subsequently foul heat transfer surfaces. The compositions comprise a combination of N-Phenyl-N'-(1,3-dimethylbutyl)-p-phenylenediamine (PDA) and an organic acid. The methods comprise adding from 1 to 2500 ppm PDA and 1 to 3500 ppm organic acid to the system experiencing the fouling problem.

U.S. Pat. No. 5,254,760 teaches that the polymerization of a vinyl aromatic compound, such as styrene, is very effectively inhibited during distillation or purification by the presence of at least one stable nitroxyl compound together with at least one aromatic nitro compound.

U.S. Pat. No. 5,446,220 discloses methods for inhibiting the polymerization of vinyl aromatic monomers in oxygen-free processing systems. These methods comprise adding from 1 to about 10,000 parts per million parts monomer of a combination of a dinitrophenol compound, a hydroxylamine compound and a phenylenediamine compound. Preferably, 2-sec-butyl-4,6-dinitrophenol or 4,6-dinitro-o-cresol are used in combination with bis-(hydroxypropyl)hydroxylamine and N,N'-di-sec-butyl-p-phenylenediamine.

U.S. Pat. Nos. 5,545,782 and 5,545,786 disclose that nitroxyl inhibitors in combination with some oxygen reduce the premature polymerization of vinyl aromatic monomers during the manufacturing processes for such monomers. Even small quantities of air used in combination with the nitroxyl inhibitors are said to result in vastly prolonged inhibition times for the monomers.

European Patent Application 0 178 168 A2 discloses a method for inhibiting the polymerization of an α,β-ethylenically unsaturated monocarboxylic acid during its recovery by distillation by using a nitroxide free radical.

European Patent Application 0 325 059 A2 discloses stabilizing vinyl aromatic compounds against polymerization by the addition of an effective amount of a polymerization inhibition composition comprising (a) a phenothiazine compound; and (b) an aryl-substituted phenylenediamine compound.

European Patent Application 0 398 633 A1 discloses a method of inhibiting acid monomer polymerization comprising adding to the monomer (a) a manganese source compound and (b) a phenylenediamine compound having at least one N—H bond therein.

European Patent Application 0 594 341 A1 discloses methods and compositions for inhibiting the polymerization of vinyl aromatic monomers under distillation conditions. The compositions comprise a combination of a phenylenediamine compound and a hydroxylamine compound.

European Patent Application 0 765 856 A1 discloses a stabilized acrylic acid composition in which the polymerization of the acrylic acid is inhibited during the distillation process for purifying or separating the acrylic acid as well as during transport and storage. The compositions comprise three components: (a) acrylic acid, (b) a stable nitroxyl radical, and (c) a dihetero-substituted benzene compound having at least one transferable hydrogen (e.g., a quinone derivative such as the monomethyl ether of hydroquinone (MEHQ)). During the distillation process, transport, and storage, components (b) and (c) are present in a polymerization-inhibiting amount. During the distillation process, oxygen (d) is preferably added with components (b) and (c). According to the specification, examples of suitable nitroxide free radical compounds include di-t-butylnitroxide; di-t-amylnitroxide; 2,2,6,6-tetramethyl-piperidinyloxy; 4-hydroxy-2,2,6,6-tetramethyl-piperidinyloxy; 4-oxo-2,2,6,6-tetramethyl-piperidinyloxy; 4-dimethylamino-2,2,6,6-tetramethyl-piperidinyloxy; 4-amino-2,2,6,6-tetramethyl-piperidinyloxy; 4-ethanoyloxy-2,2,6,6-tetramethyl-piperidinyloxy; 2,2,5,5-tetramethylpyrrolidinyloxy; 3-amino-2,2,5,5-tetramethylpyrrolidinyloxy; 2,2,5,5-tetramethyl-1-oxa-3-azacyclopentyl-3-oxy; 2,2,5,5-tetramethyl-1-oxa-3-pyrrolinyl-1-oxy-3-carboxylic acid; and 2,2,3,3,5,5,6,6-octamethyl-1,4-diazacyclohexyl-1,4-dioxy.

WO 97/46504 concerns substance mixtures containing: (A) monomers containing vinyl groups; and (B) an active amount of a mixture which inhibits premature polymerization of the monomers containing vinyl groups during their purification or distillation and contains: (i) between 0.05 and 4.5 wt %, relative to the total mixture (B), of at least one N-oxyl compound of a secondary amine which has no hydrogen atom at the sa-C atoms; and (ii) between 99.95 and 95.5 wt % relative to the total mixture (B), of at least one nitro compound. The publication also discloses a process for inhibiting the premature polymerization of monomers, and the use of mixture (B) for inhibiting the premature polymerization of monomers.

WO 98/02403 relates to inhibiting the polymerization of vinyl aromatic compounds by using a mixture of a phenol and a hydroxylamine. It is said that the process is useful in ethylbenzene dehydrogenation effluent condenser systems and styrene-water separator vent gas compressor systems and that it effectively inhibits polymerization of monomers, preventing the formation of a polymer coating on condenser and compressor equipment, thus reducing the necessity for cleaning of equipment surfaces.

WO 98/14416 discloses that the polymerization of vinyl aromatic monomers such as styrene is inhibited by the addition of a composition of a stable hindered nitroxyl radical and an oxime compound.

WO 98/25872 concerns substance mixtures containing: (A) compounds containing vinyl groups; (B) an active amount of a mixture which inhibits premature polymerization of the compounds containing vinyl groups and contains: (i) at least one N-oxyl compound of a secondary amine which does not carry any hydrogen atoms on the α-carbon atoms; and (ii) at least one iron compound; (C) optionally nitro compounds; and (D) optionally co-stabilizers. The publication also discloses a process for inhibiting the premature polymerization of compounds (A) containing vinyl groups, and the use of (B) optionally mixed with nitro compounds (C) and/or co-stabilizers (D) for inhibiting the premature polymerization of radically polymerizable compounds and stabilizing organic materials against the harmful effect of radicals.

U.K. Patent Number 1,127,127 discloses that acrylic acid can be stabilized against polymerization by the addition thereto of a nitroxide having the essential skeletal structure:

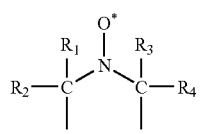

wherein $R_1$, $R_2$, $R_3$, and $R_4$ are alkyl groups and no hydrogen is bound to the remaining valencies on the carbon atoms bound to the nitrogen. The two remaining valencies that are not satisfied by $R_1$ to $R_4$ or nitrogen can also form part of a ring (e.g., 2,2,6,6 tetramethyl-4-hydroxy-piperidine-1-oxyl).

CS-260755 B1 is directed to the preparation of 4-substituted-2,2,6,6-tetramethylpiperidine nitroxyls as olefin stabilizers.

SU-334845 A1 is directed to the inhibition of the radical polymerization of oligoester acrylates using iminoxyl radical inhibitors of a given formula.

SU-478838 is directed to the inhibition of the radical polymerization of oligoester acrylates and the prevention of oligomeric peroxides using a binary polymerization inhibitor comprising quinone.

FR 2,761,060 relates to the prevention of premature polymerization of styrene during its production by dehydrogenation of ethylbenzene by injecting into the process effluent a radical inhibitor based on an oxyl-tetramethylpiperidine derivative.

The foregoing are incorporated herein by reference in their entirety.

SUMMARY OF THE INVENTION

In accordance with the present invention, inhibiting systems have been developed in which a component that is a hydrogen donor or electron acceptor or a combination of two or more of such components is used in the purification train, either alone or, preferably, in combination with a nitroxyl radical to prevent polymer growth via a "living" polymerization mechanism. When the component is used in combination with the nitroxyl radical, the effectiveness of the nitroxyl radical inhibitor can be preserved and utilized without risking high molecular weight polymer formation and/or coating of the internal parts of the purification train owing to excessive polymer growth over time.

More particularly, the present invention is directed to a method for inhibiting the premature polymerization and the polymer growth of ethylenically unsaturated monomers comprising adding to said monomers an effective amount of at least one inhibitor that is a hydrogen donor or an electron acceptor.

It is also advantageous to add a transition metal ion to the monomers. The preferred transition metal ion is copper, especially Cu(I) naphthenate.

In a preferred embodiment, the present invention is directed to a method for inhibiting the premature polymerization and the polymer growth of ethylenically unsaturated monomers comprising adding to said monomers A) an effective amount of at least one first inhibitor that is a hydrogen donor or an electron acceptor and B) at least one second inhibitor having the following structural formula:

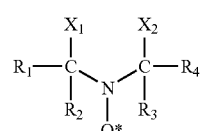

(I)

In another aspect, the present invention is directed to a composition comprising A) at least one first inhibitor that is a hydrogen donor or an electron acceptor and B) at least one second inhibitor having the following structural formula:

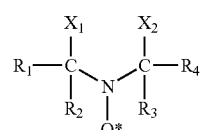

(I)

In formula (I), $R_1$ and $R_4$ are independently selected from the group consisting of hydrogen, alkyl, and heteroatom-substituted alkyl and $R_2$ and $R_3$ are independently selected from the group consisting of alkyl and heteroatom-substituted alkyl; and $X_1$ and $X_2$ (1) are independently selected from the group consisting of halogen, cyano, $COOR_7$, —S—$COR_7$, —$OCOR_7$, (wherein $R_7$ is alkyl or aryl), amido, —S—$C_6H_5$, carbonyl, alkenyl, or alkyl of 1 to 15 carbon atoms, or (2) taken together, form a ring structure with the nitrogen, preferably of five, six, or seven members.

DESCRIPTION OF THE PREFERRED EMBODIMENTS

As stated above, the present invention is directed to inhibiting systems in which at least one hydrogen donor or electron acceptor is used in the purification train, preferably in addition to at least one nitroxyl radical, to prevent polymer growth that occurs via a "living" polymerization mechanism.

The hydrogen donor compounds can, for example, be hydroxylamines, oximes, phenols, catechols, hydroquinones, thiols, anilines, dihydroanthracenes, and the like. Such compounds can include a metal species which facilitates the reduction/oxidation reactions that can accompany growth inhibition through deactivation of the growing radical chain. More particularly, the hydrogen donor compounds are preferably chosen from compounds having the structural formulae I through V.

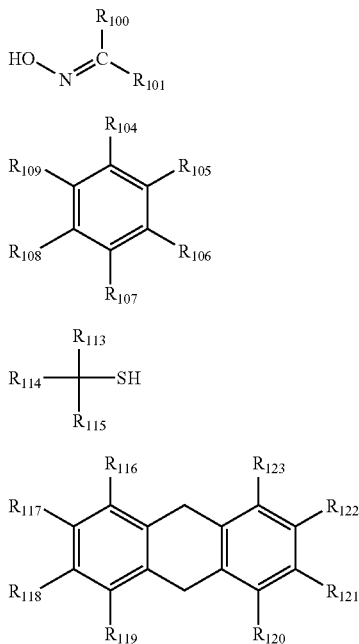

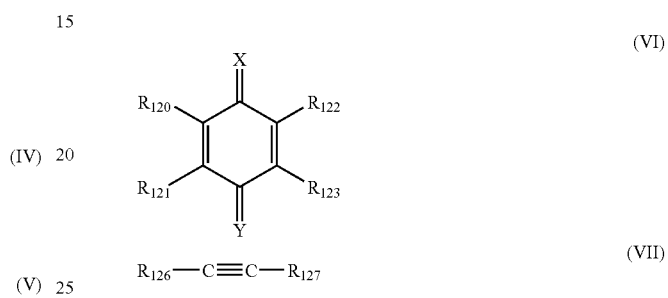

In structural formulae I through V:

$R_{100}$ and $R_{101}$ are independently selected from the group consisting of hydrogen, alkyl, alkylidene, benzylidene, aryl, benzyl, $COR_{102}$, $COOR_{102}$, $CONR_{102}R_{103}$ cyclic, heterocyclic, and substituted alkyl or aryl where the substituents are C, O, N, S, or P, or $R_{100}$ and $R_{101}$ can be taken together to form a ring structure of five to seven members;

$R_{102}$ and $R_{103}$ are independently selected from the group consisting of hydrogen, alkyl, aryl, benzyl, cyclic, heterocyclic, and substituted alkyl or aryl where the substituents are C, O, N, S, or P, or $R_{102}$ and $R_{103}$ can be taken together to form a ring structure of five to seven members;

$R_{104}$, $R_{105}$, $R_{106}$, $R_{107}$, $R_{108}$, and $R_{109}$ are independently selected from the group consisting of hydrogen, alkyl, aryl, cycloalkyl, heterocyclic, substituted alkyl, substituted aryl, $OR_{110}$, $NR_{110}R_{111}$, $SR_{110}$, $NO_2$, NO, CN, $COR_{112}$, halogen (as used herein, halogen includes fluorine, chlorine, bromine, and iodine), and/or any two adjacent groups can be taken together to form ring structure(s) of five to seven members, provided that at least one of $R_{104}$, $R_{105}$, $R_{106}$, $R_{107}$, $R_{108}$, and $R_{109}$ is OH or $NHR_{110}$;

$R_{110}$ and $R_{111}$ are independently selected from the group consisting of hydrogen, alkyl, aryl, benzyl, cyclic, heterocyclic, substituted alkyl or aryl where the substituents are C, O, N, S, or P, and $COR_{102}$, or $R_{110}$ and $R_{111}$ can be taken together to form a ring structure of five to seven members;

$R_{112}$ is $R_{102}$, $OR_{102}$, or $NR_{102}R_{103}$;

$R_{113}$, $R_{114}$, and $R_{115}$ are independently selected from the group consisting of hydrogen, alkyl, aryl, cycloalkyl, and heterocyclic moieties; and $R_{116}$, $R_{117}$, $R_{118}$, $R_{119}$, $R_{120}$, $R_{121}$, $R_{122}$, and $R_{123}$ are independently selected from the group consisting of hydrogen, alkyl, aryl, cycloalkyl, heterocyclic, substituted alkyl, substituted aryl, $OR_{110}$, $NR_{110}R_{111}$, $SR_{110}$, $NO_2$, NO, CN, $COR_{112}$, halogen, and/or any two adjacent groups can be taken together to form ring structure(s) of five to seven members.

The electron accepting compounds can, for example, be quinones, quinone imines, quinone methides, and acetylenes. Such compounds can include a metal species which facilitates the reduction/oxidation reactions that can accompany growth inhibition through deactivation of the growing radical chain. More particularly, the electron accepting compounds are preferably chosen from compounds having the structural formulae VI or VII.

In structural formula VI:

X and Y are independently selected from the group consisting of oxygen, $NR_{110}$, and $CR_{124}R_{125}$;

$R_{120}$, $R_{121}$, $R_{122}$, and $R_{123}$ are independently selected from the group consisting of hydrogen, alkyl, aryl, cycloalkyl, heterocyclic, substituted alkyl, substituted aryl, $OR_{110}NR_{110}R_{111}$, $SR_{110}$, NO, $NO_2$, CN, $COR_{112}$, and halogen, or $R_{120}$ and $R_{121}$ can be taken together and/or $R_{122}$ and $R_{123}$ can be taken together to form one or two ring structures, respectively, either of which can be of five to seven members;

$R_{124}$ and $R_{125}$ are independently selected from the group consisting of hydrogen, alkyl, aryl, cycloalkyl, heterocyclic, substituted alkyl, substituted aryl, $OR_{110}$, $NR_{110}R_{111}$, $SR_{110}$, $NO_2$, NO, CN, $COR_{112}$, halogen, and/or can be taken together to form a ring structure of five to seven members;

$R_{110}$ and $R_{111}$ are independently selected from the group consisting of hydrogen, alkyl, aryl, benzyl, cyclic, heterocyclic, substituted alkyl or aryl where the substituents are C, O, N, S, or P, and $COR_{102}$, or $R_{110}$ and $R_{111}$ can be taken together to form a ring structure of five to seven members;

$R_{112}$ is $R_{102}$, $OR_{102}$, or $NR_{102}R_{103}$; and $R_{102}$ and $R_{103}$ are independently selected from the group consisting of hydrogen, alkyl, aryl, benzyl, cyclic, heterocyclic, and substituted alkyl or aryl where the substituents are C, O, N, S, or P, or $R_{102}$ and $R_{103}$ can be taken together to form a ring structure of five to seven members.

In structural formula VII:

$R_{126}$ and $R_{127}$ are independently selected from the group consisting of hydrogen, alkyl, aryl, cycloalkyl, heterocyclic, substituted alkyl, substituted aryl, $OR_{110}$, $NR_{110}R_{111}$, $SR_{110}$, $NO_2$, NO, CN, $COR_{112}$, and halogen wherein $R_{110}$, $R_{111}$, and $R_{112}$ are defined as for formula VI.

In the foregoing, alkyl (or substituted alkyl) groups preferably contain 1 to 15 carbon atoms, e.g., methyl, ethyl, propyl, butyl, pentyl, hexyl, heptyl, octyl, nonyl, decyl, undecyl, dodecyl, tridecyl, tetradecyl, pentadecyl, and the like, and isomers thereof, e.g., t-butyl, 2-ethylhexyl, and the like. It is more preferred that the alkyl (or substituted alkyl) groups be of one to five carbon atoms (e.g., methyl, ethyl, propyl, butyl, pentyl, and isomers thereof). Substituents on the substituted alkyl groups can be any moiety that will not interfere with the hydrogen donating or electron receiving functions of the compounds. Aryl groups are preferably of from 6 to 10 carbon atoms, e.g., phenyl or naphthyl, which, in addition, may be substituted with non-interfering substituents, e.g., lower alkyl groups, halogens, and the like.

Exemplary hydrogen donating compounds include, but are not limited to, diethylhydroxylamine, cyclohexanoneoxime, dibenzylhydroxylamine, 2,4-dinitro-6-sec-butylphenol, N-phenyl-N'-(1,4-dimethylpentyl)-para-phenylenediamine, 2,5-di-t-butylhydroquinone, 2,5-di-t-amylhydroquinone, methylhydroquinone, 4-t-butylhydroquinone, 4-t-butylcatechol, octanethiol, 2,6-di-t-butyl-4-ethylphenol/Cu(I)naphthenate, dihydroanthracene, N-t-butyl-2-benzothiazolesulfenamide, N-methyl-4-nitroaniline, and the like.

Exemplary electron accepting compounds include, but are not limited to, phenylacetylene, 2,5-di-t-butyl-1,4-benzoquinone, 2,6-di-t-butyl-1,4-benzoquinone, 1,4-benzoquinone, 2-methylanthraquinone, 1,4-naphthoquinone, 2,6-di-t-butyl-4-(phenylmethylene)-2,5-cyclohexadiene-1-one, 2,6-di-t-butyl-4-(phenylimino)-2,5-cyclohexadiene-1-one, ethyl 3,4-bis-(3,5-di-t-butyl-4-one-2,5-cyclohexadienylidene)-hexane-1,6-dioate, and the like.

An effective growth inhibiting system can consist of one or more of any of the compounds described above with or without one or more nitroxyl compounds.

As stated above, in one preferred aspect, the present invention is directed to a method for inhibiting the premature polymerization of ethylenically unsaturated monomers comprising adding to said monomers, in addition to at least one first inhibitor that is a hydrogen donor or an electron acceptor, an effective amount of at least one second inhibitor that is a stable hindered nitroxyl compound having the structural formula:

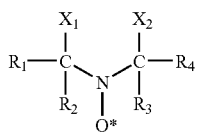

wherein $R_1$ and $R_4$ are independently selected from the group consisting of hydrogen, alkyl, and heteroatom-substituted alkyl and $R_2$ and $R_3$ are independently selected from the group consisting of alkyl and heteroatom-substituted alkyl; and $X_1$ and $X_2$ (1) are independently selected from the group consisting of halogen, cyano, $COOR_7$, $-S-COR_7$, $-OCOR_7$, (wherein $R_7$ is alkyl or aryl), amido, $-S-C_6H_5$, carbonyl, alkenyl, or alkyl of 1 to 15 carbon atoms, or (2) taken together, form a ring structure with the nitrogen.

In a particularly preferred embodiment, the stable hindered nitroxyl compound has the structural formula:

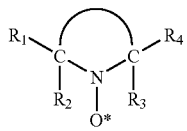

wherein $R_1$ and $R_4$ are independently selected from the group consisting of hydrogen, alkyl, and heteroatom-substituted alkyl and $R_2$ and $R_3$ are independently selected from the group consisting of alkyl and heteroatom-substituted alkyl, and the portion represents the atoms necessary to form a five-, six-, or seven-membered heterocyclic ring.

Accordingly, one of the several classes of cyclic nitroxides that can be employed in the practice of the present invention can be represented by the following structural formula:

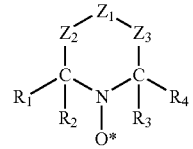

wherein $Z_1$, $Z_2$, and $Z_3$ are independently selected from the group consisting of oxygen, sulfur, secondary amines, tertiary amines, phosphorus of various oxidation states, and substituted or unsubstituted carbon atoms, such as >$CH_2$, >$CHCH_3$, >C=O, >$C(CH_3)_2$, >CHBr, >CHCl, >CHI, >CHF, >CHOH, >CHCN, >C(OH)CN, >CHCOOH, >CHCOOCH$_3$, >CHCOOC$_2$H$_5$, >C(OH)COOC$_2$H$_5$, >C(OH)COOCH$_3$, >C(OH)CHOHC$_2$H$_5$, >CR$_5$OR$_6$, >CHNR$_5$R$_6$, >CCONR$_5$R$_6$, >C=NOH, >C=CH—C$_6$H$_5$, >CF$_2$, >CCl$_2$, >CBr$_2$, >CI$_2$, >CR$_5$PR$_{13}$R$_{14}$R$_{15}$, and the like, where $R_5$ and $R_6$ are independently selected from the group consisting of hydrogen, alkyl, aryl, and acyl and $R_{13}$, $R_{14}$, and $R_{15}$ are independently selected from the group consisting of unshared electrons, alkyl, aryl, =O, OR$_{16}$, and NR$_{17}$R$_{18}$, where $R_{16}$, $R_{17}$, and $R_{18}$ are independently selected from the group consisting of hydrogen, alkyl, and aryl. Where $R_5$ and/or $R_6$ are alkyl, it is preferred that they be a lower alkyl (i.e., one having one to five carbon atoms, e.g., methyl, ethyl, propyl, butyl, pentyl, and isomers thereof).

Where $R_5$ and/or $R_6$ are aryl, it is preferred that they be aryl of from 6 to 10 carbon atoms, e.g., phenyl or naphthyl, which, in addition, may be substituted with non-interfering substituents, e.g., lower alkyl groups, halogens, and the like.

Where $R_5$ and/or $R_6$ are acyl, it is preferred that they be acyl of the structure

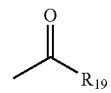

where $R_{19}$ is alkyl, aryl, OR$_{20}$, or NR$_{20}$R$_{21}$ and where $R_{20}$ and $R_{21}$ are alkyl, aryl, or

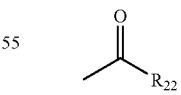

where $R_{22}$ is alkyl or aryl. Where $R_{19}$, $R_{20}$, $R_{21}$, or $R_{22}$ are alkyl, they are preferably alkyl of from 1 to 15 carbon atoms, more preferably lower alkyl of from 1 to 5 carbon atoms, as described above. Where $R_{19}$, $R_{20}$, $R_{21}$, or $R_{22}$ are aryl, they are preferably aryl of from 6 to 10 carbon atoms, as described above.

Another of the several classes of cyclic nitroxides that can be employed in the practice of the present invention can be represented by the following structural formula:

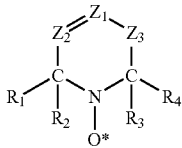

wherein $Z_1$ and $Z_2$, which may be the same or different, are nitrogen or substituted or unsubstituted carbon atoms, such as =C(H)—, =C(CH$_3$)—, =C(COOH)—, =C(COOCH$_3$)—, =C(COOC$_2$H$_5$)—, =C(OH)—, =C(CN)—, =C(NR$_5$R$_6$)—, =C(CONR$_5$R$_6$)—, and the like, and where $Z_3$, $R_5$, and $R_6$ are as described above.

The cyclic nitroxides employed in the practice of the present invention can also be derived from five-membered rings. These compounds are of the structure:

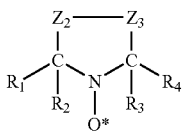

wherein $Z_2$ and $Z_3$, which may be the same or different, are sulfur, oxygen, secondary amines, tertiary amines, phosphorus of various oxidation states, or substituted or unsubstituted carbon atoms, such as, >CH$_2$, >CHCH$_3$, >C=O, >C(CH$_3$)$_2$, >CHBr, >CHCl, >CHI, >CHF, >CHOH, >CHCN, >C(OH)CN, >CHCOOH, >CHCOOCH$_3$, >CHCOOC$_2$H$_5$, >C(OH)COOC$_2$H$_5$, >C(OH)COOCH$_3$, >C(OH)CHOHC$_2$H$_5$, >CR$_5$OR$_6$, >CHNR$_5$R$_6$, >CCON$_5$R$_6$, >C=NOH, >C=CH—C$_6$H$_5$, CF$_2$, CCl$_2$, CBr$_2$, Cl$_2$, >CR$_5$PR$_{13}$R$_{14}$R$_{15}$, and the like, wherein the several R groups are as described above.

The cyclic nitroxides employed in the practice of the present invention can also have the structure:

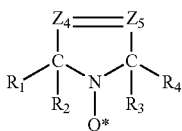

wherein $Z_4$ and $Z_5$, which can be the same or different, can be nitrogen or a substituted or unsubstituted carbon atom, such as =C(H)—, =C(CH$_3$)—, =C(COOH)—, =C(COOCH$_3$)—, =C(COOC$_2$H$_5$)—, =C(OH)—, =C(CN)—, =C(NR$_5$R$_6$)—, =C(CONR$_5$R$_6$)—, and the like, where $R_5$ and $R_6$ are as described above.

Another class of cyclic nitroxides that can be employed in the practice of the present invention is of the structure:

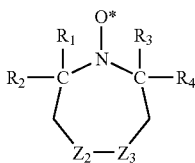

wherein $Z_2$ and $Z_3$, which may be the same or different, are sulfur, oxygen, secondary amines, tertiary amines, or substituted or unsubstituted carbon atoms, such as, >CH$_2$, >CHCH$_3$, >C=O, >C(CH$_3$)$_2$, >CHBr, >CHCl, >CHI, >CHF, >CHOH, >CHCN, >C(OH)CN, >CHCOOH, >CHCOOCH$_3$, >CHCOOC$_2$H$_5$, >C(OH)COOC$_2$H$_5$, >C(OH)COOCH$_3$, >C(OH)CHOHC$_2$H$_5$, >CR$_5$OR$_6$, >CHNR$_5$R$_6$, >CCONR$_5$R$_6$, >C=NOH, >C=CH—C$_6$H$_5$, CF$_2$, CCl$_2$, CBr$_2$, Cl$_2$, >CR$_5$PR$_{13}$R$_{14}$R$_{15}$, and the like, where the several R groups are as described above.

Further, two or more nitroxyl groups can be present in the same molecule, for example, by being linked through one or more of the Z-type moieties by a linking group E, as disclosed in U.S. Pat. No. 5,254,760, which is incorporated herein by reference.

As stated above, for all the nitroxyl structures above, $R_1$ and $R_4$ are independently selected from the group consisting of hydrogen, alkyl, and heteroatom-substituted alkyl and $R_2$ and $R_3$ are independently selected from the group consisting of alkyl and heteroatom substituted alkyl. The alkyl (or heteroatom-substituted alkyl) groups $R_1$ through $R_4$ can be the same or different and preferably contain 1 to 15 carbon atoms, e.g., methyl, ethyl, propyl, butyl, pentyl, hexyl, heptyl, octyl, nonyl, decyl, undecyl, dodecyl, tridecyl, tetradecyl, pentadecyl, and the like, and isomers thereof, e.g., t-butyl, 2-ethylhexyl, and the like. It is more preferred that $R_1$ through $R_4$ be independently selected lower alkyl (or heteroatom-substituted lower alkyl) of one to five carbon atoms (e.g., methyl, ethyl, propyl, butyl, pentyl, and isomers thereof). Where heteroatom substituents are present, they can, for example, include halogen, oxygen, sulfur, nitrogen, and the like. It is most preferred that all of $R_1$, through $R_4$ be methyl.

Examples of suitable nitroxide free radical compounds that can be used in combination with the hydrogen donor or electron acceptor in the practice of the present invention, include, but are not limited to:

N,N-di-tert-butylnitroxide;
N,N-di-tert-amylnitroxide;
N-tert-butyl-2-methyl-1-phenyl-propylnitroxide;
N-tert-butyl-1-diethylphosphono-2,2-dimethylpropylnitroxide;
2,2,6,6-tetramethyl-piperidinyloxy;
4-amino-2,2,6,6-tetramethyl-piperidinyloxy;
4-hydroxy-2,2,6,6-tetramethyl-piperidinyloxy;
4-oxo-2,2,6,6-tetramethyl-piperidinyloxy;
4-dimethylamino-2,2,6,6-tetramethyl-piperidinyloxy;
4-ethanoyloxy-2,2,6,6-tetramethyl-piperidinyloxy;
2,2,5,5-tetramethylpyrrolidinyloxy;
3-amino-2,2,5,5-tetramethylpyrrolidinyloxy;
2,2,4,4-tetramethyl-1-oxa-3-azacyclopentyl-3-oxy;
2,2,4,4-tetramethyl-1-oxa-3-pyrrolinyl-1-oxy-3-carboxylic acid;
2,2,3,3,5,5,6,6-octamethyl-1,4-diazacyclohexyl-1,4-dioxy;
4-bromo-2,2,6,6-tetramethyl-piperidinyloxy;
4-chloro-2,2,6,6-tetramethyl-piperidinyloxy;
4-iodo-2,2,6,6-tetramethyl-piperidinyloxy;
4-fluoro-2,2,6,6-tetramethyl-piperidinyloxy;
4-cyano-2,2,6,6-tetramethyl-piperidinyloxy;
4-carboxy-2,2,6,6-tetramethyl-piperidinyloxy;
4-carbomethoxy-2,2,6,6-tetramethyl-piperidinyloxy;
4-carbethoxy-2,2,6,6-tetramethyl-piperidinyloxy;
4-cyano-4-hydroxy-2,2,6,6-tetramethyl-piperidinyloxy;
4-methyl-2,2,6,6-tetramethyl-piperidinyloxy;
4-carbethoxy-4-hydroxy-2,2,6,6-tetramethyl-piperidinyloxy;
4-hydroxy-4-(1-hydroxypropyl)-2,2,6,6-tetramethyl-piperidinyloxy;
4-methyl-2,2,6,6-tetramethyl-1,2,5,6-tetrahydropyridine-1-oxyl;

4-carboxy-2,2,6,6-tetramethyl-1,2,5,6-tetrahydropyridine-1-oxyl;
4-carbomethoxy-2,2,6,6-tetramethyl-1,2,5,6-tetrahydropyridine-1-oxyl;
4-carbethoxy-2,2,6,6-tetramethyl-1,2,5,6-tetrahydropyridine-1-oxyl;
4-amino-2,2,6,6-tetramethyl-1,2,5,6-tetrahydropyridine-1-oxyl;
4-amido-2,2,6,6-tetramethyl-1,2,5,6-tetrahydropyridine-1-oxyl;
3,4-diketo-2,2,5,5-tetramethylpyrrolidinyloxy;
3-keto-4-oximino-2,2,5,5-tetramethylpyrrolidinyloxy;
3-keto-4-benzylidine-2,2,5,5-tetramethylpyrrolidinyloxy;
3-keto-4,4-dibromo-2,2,5,5-tetramethylpyrrolidinyloxy;
2,2,3,3,5,5-hexamethylpyrrolidinyloxy;
3-carboximido-2,2,5,5-tetramethylpyrrolidinyloxy;
3-oximino-2,2,5,5-tetramethylpyrrolidinyloxy;
3-hydroxy-2,2,5,5-tetramethylpyrrolidinyloxy;
3-cyano-3-hydroxy-2,2,5,5-tetramethylpyrrolidinyloxy;
3-carbomethoxy-3-hydroxy-2,2,5,5-tetramethylpyrrolidinyloxy;
3-carbethoxy-3-hydroxy-2,2,5,5-tetramethylpyrrolidinyloxy;
2,2,5,5-tetramethyl-3-carboxamido-2,5-dihydropyrrole-1-oxyl;
2,2,5,5-tetramethyl-3-amino-2,5-dihydropyrrole-1-oxyl;
2,2,5,5-tetramethyl-3-carbethoxy-2,5-dihydropyrrole-1-oxyl;
2,2,5,5-tetramethyl-3-cyano-2,5-dihydropyrrole-1-oxyl;
bis(1-oxyl-2,2,6,6-tetramethylpiperidin-4-yl) succinate;
bis(1-oxyl-2,2,6,6-tetramethylpiperidin-4-yl)adipate;
bis(1-oxyl-2,2,6,6-tetramethylpiperidin-4-yl)sebacate;
bis(1-oxyl-2,2,6,6-tetramethylpiperidin-4-yl)$_n$-butylmalonate;
bis(1-oxyl-2,2,6,6-tetramethylpiperidin-4-yl)phthalate;
bis(1-oxyl-2,2,6,6-tetramethylpiperidin-4-yl)isophthalate;
bis(1-oxyl-2,2,6,6-tetramethylpiperidin-4-yl)terephthalate;
bis(1-oxyl-2,2,6,6-tetramethylpiperidin-4-yl)hexahydroterephthalate;
N,N'-bis(1-oxyl-2,2,6,6-tetramethylpiperidin-4-yl)adipamide;
N-(1-oxyl-2,2,6,6-tetramethylpiperidin-4-yl)-caprolactam;
N-(1-oxyl-2,2,6,6-tetramethylpiperidin-4-yl)-dodecylsuccinimide;
2,4,6-tris-[N-butyl-N-(1-oxyl-2,2,6,6-tetramethylpiperidin-4-yl)]-s-triazine;
4,4'-ethylenebis(1-oxyl-2,2,6,6-tetramethylpiperazin-3-one); and the like.

As used herein, the abbreviation TEMPO stands for 2,2,6,6-tetramethyl-1-piperidinyloxy. Thus, 4-amino-TEMPO is 4-amino-2,2,6,6-tetramethyl-1-piperidinyloxy; 4-hydroxy-TEMPO is 4-hydroxy-2,2,6,6-tetramethyl-1-piperidinyloxy (also known in the art as HTEMPO); 4-oxo-TEMPO is 4-oxo-2,2,6,6-tetramethyl-1-piperidinyloxy; and so on.

It is preferred that one member of the combination employed in the practice of the present invention be 4-amino-TEMPO, 4-oxo-TEMPO, 4-hydroxy-TEMPO, or TEMPO.

Blends of two or more of the foregoing, e.g., 4-amino-TEMPO and 4-oxo-TEMPO, can also be employed.

Such stable nitroxide free radical compounds can be prepared by known methods. (See, for example, U.S. Pat. Nos. 3,163,677; 3,334,103; 3,372,182; 3,422,144; 3,494,930; 3,502,692; 3,873,564; 3,966,711; and 4,665,185; which are incorporated herein by reference.) They are suitable for use over a wide range of temperatures, but distillation temperatures employed with the ethylenically unsaturated monomers that are stabilized by the process of the present invention typically range from about 60° C. to about 180° C., preferably from about 70° C. to about 165° C., and, more preferably, from about 80° C. to about 150° C. Such distillations are generally performed at an absolute pressure in the range of about 10 to about 1,200 mm of Hg.

The ethylenically unsaturated monomer, the premature polymerization and polymer growth of which is an object of the present invention, can be any such monomer for which unintended polymerization and/or polymer growth during its manufacture, storage, and/or distribution is a problem. Among those monomers that will benefit from the practice of the present invention are: styrene, α-methylstyrene, styrene sulfonic acid, vinyltoluene, divinylbenzenes, polyvinylbenzenes, alkylated styrene, 2-vinylpyridine, acrylonitrile, methacrylonitrile, methyl acrylate, ethyl acrylate, methyl methacrylate, ethyl methacrylate, acrylic acid, methacrylic acid, butadiene, chloroprene, isoprene, and the like.

The ethylenically unsaturated monomers will not necessarily be stabilized indefinitely by the presence of the inhibitor(s), especially when the monomers are heated as in distillation, but they can be considered to be stabilized as long as A) there is a measurable increase in the time for which they can be heated before the onset of polymerization and/or polymer growth in a static system, B) the amount of polymer made at a constant temperature remains constant over time in a dynamic system, and/or C) the rate of polymer growth is significantly slower than when the growth inhibiting system is not present.

Those skilled in the art will understand that, if desired, free radical scavengers can also be included in the practice of the present invention. For example, air or $O_2$, as disclosed in U.S. Pat. Nos. 5,545,782 and 5,545,786, can be added, as can the aromatic nitro compounds disclosed in U.S. Pat. No. 5,254,760, the dihetero-substituted benzene compounds having at least one transferable hydrogen, e.g., a quinone derivative such as the mono-methyl-ether of hydroquinone disclosed in European Patent Application 0 765 856 A1, the iron compounds disclosed in WO 98/25872, and other inhibitors, e.g., phenolics and certain inorganic salts, well-known to those skilled in the art.

The polymerization inhibitor(s) can be introduced into the monomer to be protected by any conventional method. They can, for example, be added as a concentrated solution in suitable solvents just upstream from the point of desired application by any suitable means. In addition, individual inhibiting components can be injected separately into the distillation train along with the incoming feed and/or through separate and multiple entry points, provided there is an efficient distribution of the inhibiting composition. Since the inhibitors are gradually depleted during the distillation operation, it is generally advantageous to maintain the appropriate amount of them in the distillation apparatus by adding them during the course of the distillation process. Adding inhibitors can be done either on a generally continuous basis or intermittently, in order to maintain the inhibitor concentration above the minimum required level.

The total inhibitor concentration should be from about 1 to about 2000 ppm versus the monomer being inhibited; preferably from about 5 to about 1000 ppm, depending on the conditions of use.

The ratio of the first component, or blend A (electron acceptor or hydrogen donor compound or blend thereof) to a second component, or blend B (nitroxyl or nitroxyls), based on the total of both components is from about 1 to 100 wt % A: about 99 to 0 wt % B; preferably, about 25-75 wt % A: about 75-25 wt % B; more preferably about 50-75 wt % A: about 50-25 wt % B.

The advantages and the important features of the present invention will be more apparent from the following examples.

EXAMPLES

Procedure for Polymer Growth Reboiler Test
Preparation of Feed Solution

Tert-butylcatechol (TBC) is removed from commercially available styrene by distillation under vacuum. Removal of TBC is verified by caustic titration. The desired amount of inhibitor(s) is added to this TBC-free styrene either directly or by first making a concentrated solution of the inhibitor in TBC-free styrene followed by further dilution with TBC-free styrene.

Procedure for Polymer Growth Dynamic Reboiler Test

A quantity of the Feed Solution containing inhibitor or blend of inhibitors at the desired charge (stated as a wt/wt total inhibitor to styrene) is added to a round-bottom flask (the Pot). A known quantity of insoluble polymer capable of growing via a living mechanism is placed inside the Pot and submersed in the Feed Solution in the Pot. The insoluble polymer can be retained in the Pot by any suitable means. Typically, the insoluble polymer is securely wrapped in a piece of filter paper or wire mesh and suspended by a wire within the Pot. Conversely, the Bottoms Stream line (as described below) can be covered with filter paper or mesh to prevent insoluble polymer from being removed from the Pot. The Pot is placed in a hot oil bath, and the Feed Solution in the pot is heated to the desired temperature (usually 130° C.) and brought to reflux by adjusting the pressure/vacuum. Once the Pot contents are at temperature, a continuous stream of fresh Feed Solution is begun at a rate that will add the volume of the initial Pot solution to the Pot over a period of time called the "residence time" (typically one hour). At the same time at which the fresh Feed Solution flow is begun, the Bottoms Stream flow is also begun. The Bottoms Stream is solution in the Pot that is removed at the same rate as the fresh Feed Solution is added. The equal flows of Feed and Bottoms Streams causes the quantity in the Pot to remain constant over the time of the experiment while allowing continuous replenishment of inhibitor. This procedure simulates the way inhibitors are used in a distillation train of a plant producing vinyl monomers. The experiment continues with flow in and out of the Pot for a specified length of time (usually 7 hours). Samples are collected hourly from the Bottoms Stream. These samples are analyzed for polymer content via the methanol turbidity method. The amount of polymer in the samples is an indication of effectiveness of the inhibitor system being tested.

After running for the specified length of time, the vacuum is released and, if used, the filter paper bag of polymer is removed. The Pot solution is filtered to recover any insoluble polymer that may have escaped from the bag. Any filtered polymer and the polymer in the filter paper bag are allowed to dry open to the atmosphere for at least 18 hours. The polymer can be further dried by placing it in a vacuum oven at 40-50° C. under full vacuum for 1-2 hours. The polymer is then weighed. Percent growth is determined by the following equation:

$$\% \text{ growth} = \frac{\text{weight of final insoluble polymer} - \text{weight of initial insoluble polymer}}{\text{weight of initial insoluble polymer}} \times 100$$

Lower percent growth numbers indicate increased effectiveness of the system to inhibit polymer growth via a "living" mechanism.

Preparation of Insoluble Polymer Capable of Growing

Tert-butylcatechol (TBC) was removed from commercially available styrene and from commercially available divinylbenzene (DVB) by distillation under vacuum. Removal of TBC was verified by caustic titration. TBC-free styrene (50 g), ethylbenzene (49 g), TBC-free DVB (1 g), and 4-oxo-TEMPO (0.01 g) were combined. The mixture was stirred at 130° C. until the mixture polymerized to a gel (about 3 hours). The gel-like system was cooled to about 60° C., and 2 liters of ethylbenzene were added. The resulting mixture was stirred for 2 hours at 50° C., filtered by vacuum filtration until the gel was mostly dry, and remaining solvent was removed by evaporation under full vacuum at 50° C. A hard, white polymer was obtained (25 g, 49% yield).

Procedure for Multi-Pass Reboiler Test

Preparation of First Pass Feed Solution

Tert-butylcatechol (TBC) is removed from commercially available styrene by distillation under vacuum. Removal of TBC is verified by caustic titration. The desired amount of inhibitor(s) is added to this TBC-free styrene either directly or by first making a concentrated solution of the inhibitor in TBC-free styrene followed by further dilution with TBC-free styrene.

Procedure for Reboiler Test (a Dynamic Test):

A quantity of the Feed Solution containing inhibitor (blend) at the desired charge (stated as a wt/wt total inhibitor to styrene) is added to a round-bottom flask (the Pot) and heated to the desired temperature (usually 130° C.) and brought to reflux by adjusting the pressure/vacuum. Once the Pot contents are at temperature, a continuous stream of fresh Feed Solution is begun at a rate that will add the volume of the initial Pot solution to the Pot over a period of time called the residence time (typically, one hour). At the same time that the fresh Feed Solution flow is begun, the Bottoms Stream flow is also begun. The Bottoms Stream is solution in the Pot that is removed at the same rate as the fresh Feed Solution is added. The equal flows of Feed and Bottoms Streams cause the quantity in the Pot to remain constant over the time of the experiment, while allowing continuous replenishment of inhibitor. This procedure simulates the way inhibitors are used in a distillation train of a plant producing vinyl monomers. The experiment continues with flow in and out of the Pot for a specified period of time. Typically, the First Pass runs for 10 hours, the Second Pass runs for 9 hours, the Third Pass runs for 8 hours, etc.

Samples are collected hourly from the Bottoms Stream. These samples are analyzed for polymer content via the methanol turbidity method. The amount of polymer in the samples is an indication of effectiveness of the inhibitor system being tested. "Average Polymer Make" is the average of the polymer content values for samples taken after 4 hours running.

The material left in the Pot at the end of the run is quickly removed and cooled, to stop any further polymerization. The material is then concentrated, if necessary, under reduced pressure at 40° C. until the polymer content is >5 wt %. A sample of this polymer solution is then analyzed by Gel Permeation Chromatography (GPC) to determine the weighted average molecular weight ($M_w$) of the polymer.

Preparation of Second and Third Pass Feed Solutions:

The Bottoms Stream from the previous Pass is collected except for the material in the Pot at the end of the run. The amounts of inhibitor(s) in the First Pass Feed Solution and the Bottoms Stream from the First Pass are determined by appropriate analytical method(s), e.g., gas chromatography. An amount of inhibitor(s) is added to the collective Bottoms Stream from the First Pass to increase the level of inhibitor(s) in the Bottoms Stream to a level equal to that found in the First Pass Feed Solution. An equivalent amount of inhibitor(s) is added to the collective Bottoms Streams for subsequent Passes.

Evaluation of the Results

The difference in the "Average Polymer Make" made in one Pass versus subsequent Passes is an indication of the ability of the inhibiting system to prevent or allow polymer to grow. For example, an increase in the amount of polymer made going from one Pass to the next which is roughly equivalent to the amount of polymer made during the First Pass is an indication that the inhibiting system effectively prevents polymer growth during recycle. Conversely, an increase in the amount of polymer made going from one Pass to the next that is dramatically greater (about 10 times or more) than the amount of polymer made during the First Pass is an indication that the inhibiting system does not effectively prevent polymer growth during recycle.

The difference in the $M_w$ of the polymer made in one Pass versus subsequent Passes is an indication of the ability of the inhibiting system to prevent or allow polymer to grow. Any significant increase in $M_w$ of the polymer made in one Pass versus the previous Pass is an indication that the inhibiting system does not prevent polymer growth. The closer to zero the increase in $M_w$, the better the growth inhibiting ability of the system.

The effectiveness of hydrogen donor systems and their blends with nitroxyls is shown in Tables 1 and 4. The effectiveness of electron-accepting systems and their blends with nitroxyls is shown in Table 2. Examples of Synergistic Blends of Donor and Acceptor systems are shown in Table 3. The first two examples in each of Tables 1-3 are baseline examples of nitroxyl inhibitors used alone—conditions that are known to allow polymer growth via a "living" mechanism. Under these Polymer Growth Test baseline conditions, about 700% growth was observed. All other examples in Tables 1-3 gave less than 700% growth, indicating that those systems provided some growth inhibiting activity.

The first example in Table 4 is also a baseline example of a nitroxyl inhibitor used alone—conditions that are known to allow polymer growth via a "living" mechanism. Under these Multi-Pass Test baseline conditions, the average polymer make increased 100-fold and the molecular weight ($M_w$) of the polymer made increased nearly 10-fold over three passes. The other examples in Table 4 gave minor increases in average polymer make (versus the baseline example) and essentially no change in molecular weight of the polymer over three passes, indicating that those systems provided significant growth inhibiting activity.

TABLE 1

Performance of Hydrogen Donor Systems Using Polymer Growth Test Method

| Inhibitor System | Inhibitor Charge(s) (ppm vs styrene) | Growth (% increase in weight of insoluble polymer after 7 hrs.) |
|---|---|---|
| 4-oxo-TEMPO (baseline) | 300 | 684 |
| 4-hydroxy-TEMPO (baseline) | 300 | 736 |
| 4-oxo-TEMPO/diethylhydroxylamine | 300/3000 | 20 |
| 4-oxo-TEMPO/diethylhydroxylamine | 300/600 | 76 |
| 4-oxo-TEMPO/cyclohexanoneoxime | 300/3000 | 382 |
| 4-oxo-TEMPO/dibenzylhydroxylamine | 300/600 | 388 |
| 4-oxo-TEMPO/DNBP | 150/1500 | −2 |
| DNBP | 1500 | 20 |
| DNBP/PDA | 900/600 | 11 |
| DNBP/PDA (air) | 900/600 (8 cc/min) | −13 |
| 4-oxo-TEMPO/2,5-di-t-butylhydroquinone | 300/3000 | 175 |
| 4-oxo-TEMPO/2,5-di-t-butylhydroquinone | 300/600 | 197 |
| 4-oxo-TEMPO/2,5-di-t-amylhydroquinone | 300/900 | 173 |
| 4-oxo-TEMPO/2,5-di-t-amylhydroquinone | 300/600 | 275 |
| 4-oxo-TEMPO/methylhydroquinone | 300/600 | 420 |
| 4-oxo-TEMPO/4-t-butylhydroquinone | 300/300 | 464 |
| 4-oxo-TEMPO/4-t-butylcatechol, 4-oxo-TEMPO/octanethiol | 300/3000 300/3000 | 56 220 |
| 4-oxo-TEMPO/octanethiol | 300/1500 | 420 |
| 4-oxo-TEMPO/2,6-di-t-butyl-4-methylphenol/Cu(I)naphthenate | 300/3000/150 | 416 |
| 4-oxo-TEMPO/dihydroanthracene | 300/3000 | 524 |
| 4-oxo-TEMPO/N-t-butyl-2-benzothiazole-sulfenamide | 300/3000 | 532 |
| 4-oxo-TEMPO/N-methyl-4-nitroaniline | 300/3000 | 538 |

PDA = N-phenyl-N'-(1,4-dimethylpentyl)-para-phenylenediamine
DNBP = 2,4-dinitro-6-sec-butylphenol

TABLE 2

Performance of Electron Acceptor Systems Using Polymer Growth Test Method

| Inhibitor System | Inhibitor Charge(s) (ppm vs. styrene) | Growth (% increase in weight of insoluble polymer after 7 hrs.) |
|---|---|---|
| 4-oxo-TEMPO (baseline) | 300 | 684 |
| 4-hydroxy-TEMPO (baseline) | 300 | 736 |
| 4-oxo-TEMPO/phenylacetylene | 300/3000 | 540 |
| 4-oxo-TEMPO/2,5-di-t-butyl-1,4-benzoquinone | 300/3000 | 96 |
| 4-oxo-TEMPO/2,5-di-t-butyl-1,4-benzoquinone | 300/600 | 180 |
| 4-oxo-TEMPO/2,6-di-t-butyl-1,4-benzoquinone | 150/1500 | 358 |
| 4-oxo-TEMPO/1,4-benzoquinone | 300/600 | 136 |
| 4-oxo-TEMPO/2-methylanthraquinone | 300/600 | 235 |
| 4-oxo-TEMPO/1,4-naphthoquinone | 300/600 | 308 |
| 4-oxo-TEMPO/2,6-di-t-butyl-4-(phenylmethylene)-2,5-cyclohexadiene-1-one | 150/1500 | 14 |
| 2,6-di-t-butyl-4-(phenylmethylene)-2,5-cyclohexadiene-1-one | 1500 | 40 |
| 4-oxo-TEMPO/2,6-di-t-butyl-4-(phenylimino)-2,5-cyclohexadiene-1-one | 300/2900 | 396 |
| 4-oxo-TEMPO/ethyl 3,4-bis-(3,5-di-t-butyl-4-one-2,5-cyclohexadienylidene)-hexane-1,6-dioate | 300/600 | 525 |

TABLE 3

Performance of Synergistic Blends of Donors and Acceptors Using Polymer Growth Test Method

| Inhibitor System | Inhibitor Charge(s) (ppm vs. styrene) | Growth (% increase in weight of insoluble polymer after 7 hrs.) |
|---|---|---|
| 4-oxo-TEMPO (baseline) | 300 | 684 |
| 4-hydroxy-TEMPO (baseline) | 300 | 736 |

TABLE 3-continued

Performance of Synergistic Blends of Donors and
Acceptors Using Polymer Growth Test Method

| Inhibitor System | Inhibitor Charge(s) (ppm vs. styrene) | Growth (% increase in weight of insoluble polymer after 7 hrs.) |
|---|---|---|
| 4-oxo-TEMPO/2,5-di-t-butylhydroquinone | 300/600 | 197 |
| 4-oxo-TEMPO/2,5-di-t-butyl-1,4-benzoquinone | 300/600 | 180 |
| 4-oxo-TEMPO/2,5-di-t-butylhydroquinone/2,5-di-t-butyl-1,4-benzoquinone | 300/150/450 | 112 |
| 4-oxo-TEMPO/2,5-di-t-butylhydroquinone/2,5-di-t-butyl-1,4-benzoquinone | 300/60/540 | 128 |

TABLE 4

Performance of Hydrogen Donor Systems
Using the Multi-Pass Test Method

| Inhibitor System/Pass | Average Polymer Make (wt %) | $M_w$ of Polymer |
|---|---|---|
| 300 ppm 4-oxo-2,2,6,6-tetramethyl-1-piperidinyloxy (4-oxo-TEMPO) | | |
| Pass 1 | 0.052 | 3,910 |
| Pass 2 | 1.45 | 17,000 |
| Pass 3 | 7.45 | 31,700 |
| 45 ppm 4-oxo-TEMPO; 420 ppm PDA; 900 ppm DNBP; 3 cc/min air | | |
| Pass 1 | 0.026 | 1,430 |
| Pass 2 | 0.150 | 1,330 |
| Pass 3 | 0.363 | 1,760 |
| 48 ppm 4-oxo-TEMPO; 1125 ppm DNBP | | |
| Pass 1 | 0.146 | 3,840 |
| Pass 2 | 0.485 | 4,340 |
| Pass 3 | 0.640 | 4,120 |

PDA = N-phenyl-N'-(1,4-dimethylpentyl)-para-phenylenediamine
DNBP = 2,4-dinitro-6-sec-butylphenol In view of the many changes and modifications that can be made without departing from principles underlying the invention, reference should be made to the appended claims for an understanding of the scope of the protection to be afforded the invention.

What is claimed is:

1. A method for inhibiting polymer growth of a polymer present in ethylenically unsaturated monomers, said monomers selected from the group consisting of styrene, α-methylstyrene, styrene sulfonic acid, divinylbenzene, polyvinylbenzene, alkylated styrene, butadiene and isoprene monomers, said process comprising (A) providing the polymer to the ethylenically unsaturated monomers; and (B) adding to the ethylenically unsaturated monomers, an inhibitor composition consisting of:

(i) at least one first inhibitor consisting of a hydrogen donor of the structure

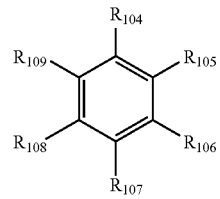

wherein $R_{104}$, $R_{105}$, $R_{106}$, $R_{107}$, $R_{108}$, and $R_{109}$ are independently selected from the group consisting of hydrogen, alkyl, aryl, cycloalkyl, heterocyclic, substituted alkyl, substituted aryl, $OR_{110}$, —$SR_{110}$, NO, $NO_2$, CN, $COR_{112}$, halogen, and/or any two adjacent groups can be taken together to form ring structure(s), respectively of five to seven members, provided that at least one of $R_{104}$, $R_{105}$, $R_{106}$, $R_{107}$, $R_{108}$, and $R_{109}$ is OH;

$R_{110}$ and $R_{111}$ are independently selected from the group consisting of hydrogen, alkyl, aryl, benzyl, cyclic, heterocyclic, substituted alkyl or aryl where the substituents are C, O, N, S, or P, and $COR_{102}$, or $R_{110}$ and $R_{111}$ can be taken together to form a ring structure of five to seven members;

$R_{112}$ is $R_{102}$, $OR_{102}$, or $NR_{102}R_{103}$, $R_{102}$ and $R_{103}$ are independently selected from the group consisting of hydrogen, alkyl, aryl, benzyl, cyclic, heterocyclic, and substituted alkyl or aryl where the substituents are C, O, N, S, or P, or $R_{102}$ and $R_{103}$ can be taken together to form a ring structure of five to seven members, and (ii) at least one second inhibitor having the following structural formula:

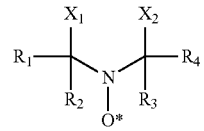

wherein $R_1$ and $R_4$ are independently selected from the group consisting of hydrogen, alkyl, and heteroatom-substituted alkyl, $R_2$ and $R_3$ are independently selected from the group consisting of alkyl and heteroatom-substituted alkyl, and $X_1$ and $X_2$ (1) are independently selected from the group consisting of halogen, cyano, amido, —S—$C_6H_5$, carbonyl, alkenyl, alkyl of 1 to 15 carbon atoms $COOR_7$, —S—$COR_7$, —$OCOR_7$, wherein $R_7$ is alkyl or aryl, or (2) taken together, form a ring structure with the nitrogen; and (iii) N-phenyl-N'-(1,4-dimethylpentyl)-para-phenylenediamine and wherein the polymer's growth is decreased by the presence of the inhibitor composition.

2. The method of claim 1, wherein the at least one first inhibitor is 2,4-di-nitro-sec-butyl-phenol.

3. The method of claim 1, wherein the at least one second inhibitor is 4-oxo-2,2,6,6-tetramethyl-piperidinyloxy.

4. The method of claim 1, wherein the weight ratio of the at least one first inhibitor and the least one second inhibitor is 10:1.

5. The method of claim 1, wherein the at least one first inhibitor is present in an amount of 1500 ppm and the at least one second inhibitor is present in an amount of 150 ppm.

6. The method of claim 1, wherein the polymer's growth is decreased by 2%.

7. The method of claim 1, wherein the ethylenically unsaturated monomers are selected from the group consisting of styrene, α-methylstyrene, divinylbenzene, polyvinylbenzene and alkylated styrene monomers.

8. The method of claim 1, wherein the polymer comprises monomers selected from the group consisting of styrene, α-methylstyrene, styrene sulfonic acid, divinylbenzene, polyvinylbenzene, alkylated styrene, butadiene and isoprene monomers.

9. The method of claim 7, wherein the polymer comprises monomers selected from the group consisting of styrene, α-methylstyrene, divinylbenzene, polyvinylbenzene and alkylated styrene monomers.

10. The method of claim 1, wherein the monomers which form the polymer are the same as the monomers in which the polymer is present.

* * * * *